Figure 1:
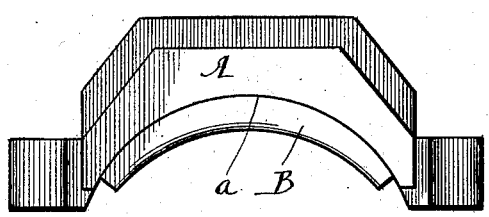

No. 705,760. Patented July 29, 1902.
H. H. HEWITT.
JOURNAL BEARING.
(Application filed Dec. 24, 1901.)

(No Model.) 3 Sheets—Sheet 1.

Witnesses:
Fred Gerlach
Alberta Adamick

Inventor:
H. H. Hewitt.
By Price & Fisher
his Attorneys.

THE NORRIS PETERS CO., PHOTO-LITHO., WASHINGTON, D. C.

No. 705,760. Patented July 29, 1902.
H. H. HEWITT.
JOURNAL BEARING.
(Application filed Dec. 24, 1901.)
(No Model.) 3 Sheets—Sheet 2.
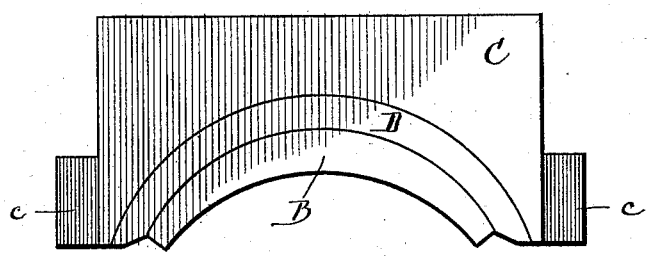
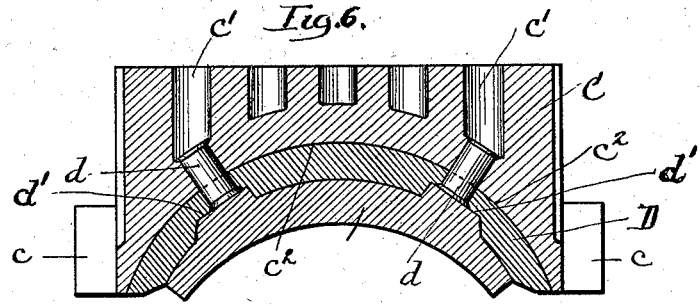
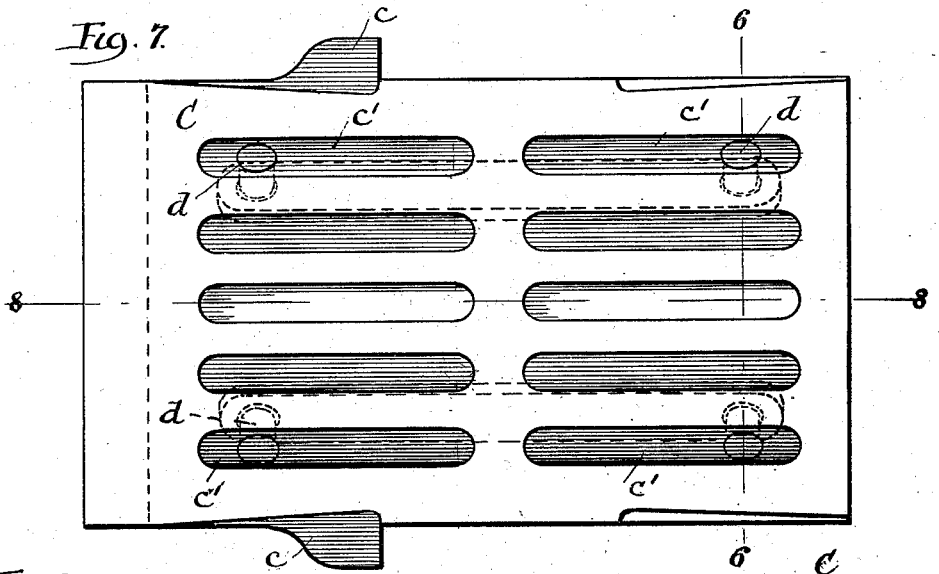

No. 705,760. Patented July 29, 1902.
H. H. HEWITT.
JOURNAL BEARING.
(Application filed Dec. 24, 1901.)
(No Model.) 3 Sheets—Sheet 3.
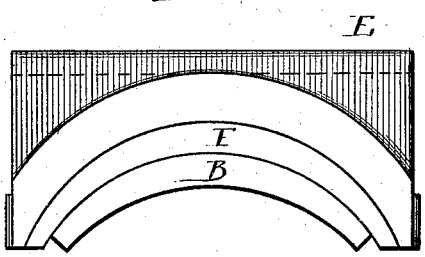
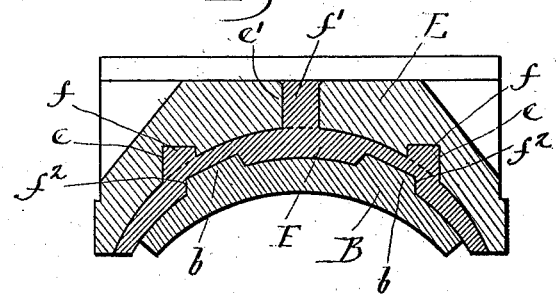
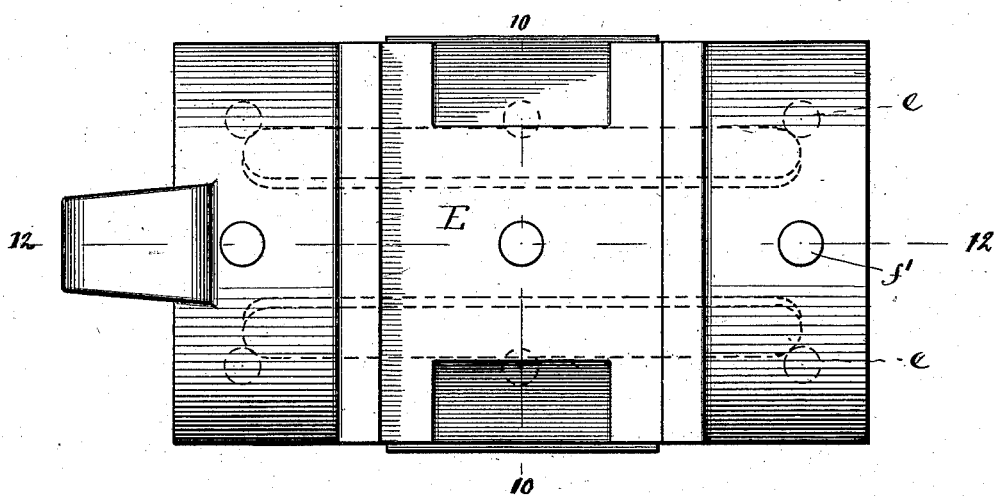
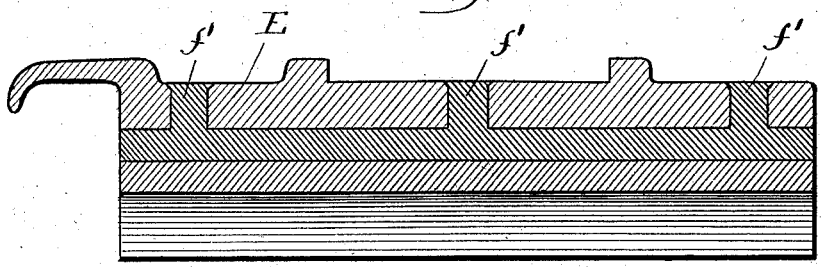
Witnesses:
Fred Gulack
Alberta Adamick
Inventor:
H. H. Hewitt
By Price & Fisher
his Attorneys.

UNITED STATES PATENT OFFICE.

HERBERT H. HEWITT, OF BUFFALO, NEW YORK.

JOURNAL-BEARING.

SPECIFICATION forming part of Letters Patent No. 705,760, dated July 29, 1902.

Application filed December 24, 1901. Serial No. 87,120. (No model.)

*To all whom it may concern:*

Be it known that I, HERBERT H. HEWITT, a citizen of the United States, and a resident of Buffalo, in the county of Erie, State of New York, have invented certain new and useful Improvements in Journal-Bearings, of which the following is a full, clear, and exact description.

This invention has relation more particularly to the improvement in bearings designed for the journals of car-axles; and the invention consists in the features of novelty hereinafter described, illustrated in the accompanying drawings, and more particularly pointed out in the claims at the end of this specification.

In the construction of car-axle bearings it has been common practice to line the inner face of the bearing with soft metal to enable the bearing to more accurately conform to the surface of the journal. In practice it has been discovered that the soft metal (the main purpose of which was originally to enable the bearing to conform to the journal) more effectively resists wear than does the brass or composition of which the bearing proper is made, and the tendency of modern practice is therefore to increase the thickness of the lining.

One object of this invention is to provide journal-bearings with thick soft-metal linings of such construction that when worn out they may be readily replaced.

Another object of the invention is to so construct the inner or concave face of the brass or bearing proper that in event the lining should be completely exhausted before its removal the brass or bearing proper will be adapted to receive the wear of the journal until a new lining of soft metal may be inserted.

In certain classes of car-axle bearings it is the practice to employ a wedge or key above the brass or bearing proper, such key being adapted to receive directly upon it the journal-box.

Another object of this invention is to form a composite wedge and bearing connected rigidly together, the inner face of the bearing being provided with seats to receive lugs upon a detachable lining and being adapted also to conform with the surface of the journal and afford a wearing-surface in event the lining should become completely exhausted before its removal and replacement.

There are still a considerable number of journal-bearings used of a design in which no wedges or keys are employed, the backs of the journal bearings or brasses being adapted to the interior of the housing or oil-box in which they are used, these brasses or bearings proper being usually made very thick.

A still further object of this invention is to provide bearings of this last-mentioned type with removable soft-metal linings and also with intermediate or emergency wearing-surfaces of brass or like antifriction metal, which will serve to temporarily take the wear of the journals in event the soft-metal linings are completely exhausted before their replacement.

Figure 2:
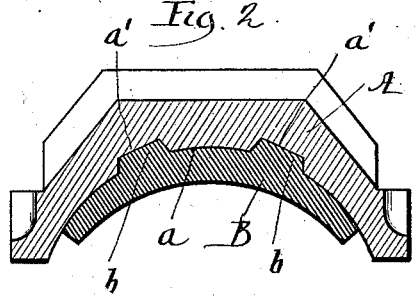
Figure 3:
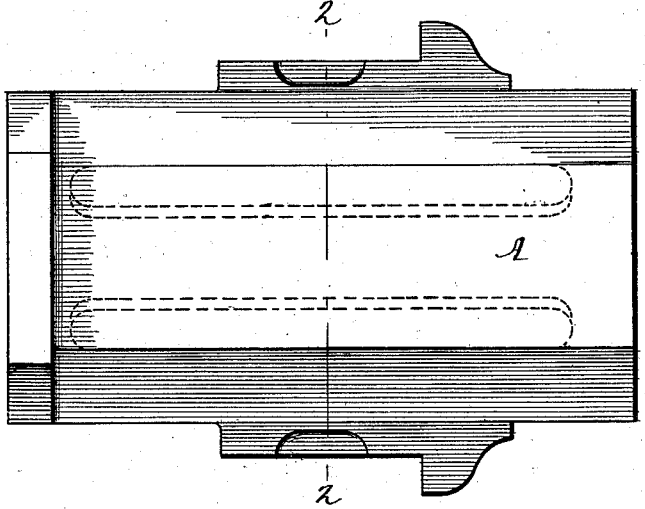
Figure 4:
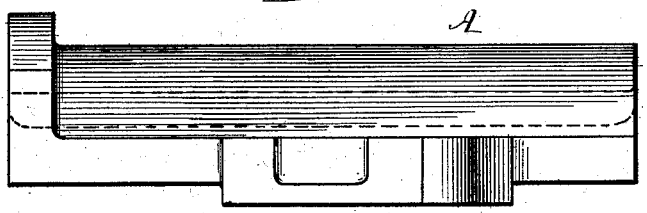

Referring to the accompanying drawings, Figure 1 is a view in end elevation of the journal-bearing having my invention applied thereto. Fig. 2 is a view in cross-section on line 2 2 of Fig. 3. Fig. 3 is a plan view. Fig. 4 is a view in side elevation. Fig. 5 is an end view of a composite bearing and wedge or key. Fig. 6 is a view in cross-section on line 6 6 of Fig. 7. Fig. 7 is a plan view. Fig. 8 is a view in section on line 8 8 of Fig. 7. Fig. 9 is an end view of a journal-bearing and the type with which no key or wedge is used. Fig. 10 is a view in cross-section on line 10 10 of Fig. 11. Fig. 11 is a plan view. Fig. 12 is a view in section on line 12 12 of Fig. 11.

Referring more particularly to the construction illustrated in Figs. 1 to 4 of the drawings, A designates the body of the journal-bearing, which as to its general outline may be of the usual Master Car-Builders' type. This bearing A will be formed of brass or similar composition, and its inner or concave face *a* will be so shaped as to conform to the journal in event the lining B should be completely worn out before its replacement. The lining B is of comparatively soft metal, being sufficiently hard, however, to resist the weight upon it. This lining B extends from end to end of the bearing A, and consequently guards the brass or bearing proper from wear at all points. The inner face of the brass or bearing A is formed with seats *a'*, adapted to receive lugs *b*, that are formed upon the back of the lining B. The seat $a'$ and the lugs $b$ are so relatively shaped that the lining B can readily be set in position, as shown, and can be as readily removed when the lining is worn out. The lining B is preferably cast in iron molds, which give to the lining a clean smooth finish and enable the lugs $b$ to readily enter the seats $a'$ and also enables the upper surface of the lining to snugly conform to the inner or lower surface of the brass or bearing proper, A. The seats or recesses $a'$ do not extend through the end portions of the bearing A, these portions of the bearing being solid, so that not only is the lining held against longitudinal movement, but in event of the exposure of the bearing A to wear the end portions will more effectively engage those parts of the journal—i. e., the flanges and shoulders—than would be possible if the recesses or seats $a'$ extended through the ends of the brass or bearing proper.

From the foregoing construction it will be seen that when the bearing is placed in service the lining B will be simply set within the brass or bearing proper, A, and the weight upon the top of the bearing will firmly hold the lining against the surface of the journal. The lugs $b$ entering the seats or recesses $a'$ will guard the lining against independent movement. When, however, the lining B is practically worn out, the oil-box will be jacked up and a new lining will be substituted for the old. Of course in event of any adherence of the lining B to the brass or bearing proper, A, then the latter will also be removed when the lining is worn out and sufficient heat will be applied to melt away any particles of the old lining adhering to the surface of the brass.

In the form of the invention illustrated in Figs. 5 to 8 of the drawings I have shown a composite bearing and key or wedge. In this form of the invention C designates the back of the bearing, that preferably will be formed of malleable iron or other strong, tough, and cheap metal, the upper surface of this back being preferably flat, so that the top of the oil-box may conveniently rest thereon. The sides of the back C will be provided with the usual lateral lugs or wings $c$. The back C will be formed with an inner face $c^2$, against which will snugly fit the concavo-convex brass or bearing proper, D, that will be formed of brass or similar antifriction composition. The brass D will have its inner or under surface shaped so as to conform to the surface of the journal and receive the wear in event the lining B should be completely worn out before its replacement. The brass or bearing proper, D, is preferably connected to the back C by rivets $d$, these rivets having, preferably, their upper and lower ends located respectively in grooves $c'$ in the upper surface of the back C and in seats or recesses $d'$, formed in the inner face of the brass or bearing proper, D. The seats or recesses $d'$ are adapted to receive the lugs $b$, that are formed on the back of the soft-metal lining B, and the seats $d'$ and lugs $b$ are so shaped as to permit the lining B to be readily set in position with respect to the brass or bearing D and to be readily removed when a new lining is to be substituted. The brass or bearing proper, D, and the lining B extend from end to end of the back C. Consequently both the lining and the brass are in position to resist wear at all points of the journal. In this form of the invention, as in that illustrated upon Sheet 1 of the drawings, the removable lining B is securely held against displacement by the lugs $b$, and the solid ends of the brass or bearing proper, D, guard against longitudinal movement of the lining and also afford an effective bearing at the ends of the journal in case the lining should become completely worn out before its removal.

The composite bearing last described avoids the necessity of employing any supplemental key or wedge. The back C, of malleable or like tough and cheap metal, possesses the advantage of strength and economy. The concavo-convex brass or bearing proper, D, presents an emergency wearing-surface adapted to engage the journal in event the lining B should be exhausted, while this lining B, being readily removable, permits a new lining to be substituted whenever desired.

In Figs. 9 to 12 of the drawings I have shown my invention as applied to that type of car-axle bearings in connection with which no key or wedge is employed. The back E of this form of bearing will be formed of malleable iron or like cheap and durable metal, and its concaved inner face will be formed with suitable seats or recesses $e$, adapted to receive lugs $f$, that are formed upon the back of the brass or bearing proper, F. The back E will be formed with one or more holes $e'$, adapted to receive the offset pins or lugs $f'$, that project from the back, and the ends of the pins of lugs $f'$ will be upset, so as to securely and rigidly hold the brass or bearing proper, F, in position upon the under side of the back E. The inner concave surface of the brass or bearing F (which will be formed of brass or like suitable antifriction composition) will be formed with seats or recesses $f^2$, adapted to receive the lug $b$ upon the back of the soft-metal lining B. The lining B is of the construction hereinbefore described, and the ends of the brass or bearing proper, F, will be solid, so as to hold the lining against displacement and so as to present a smooth wearing-surface to the ends of the journal in event the lining B is completely worn out and the wear is thus brought upon the brass F. With this form of the invention, as with that heretofore described, the lining B is designed to receive the ordinary wear; but in event of failure to replace the lining B in case it should become completely worn out the under surface of the brass or bearing proper, F, extending, as it does, from end to end of the journal, will take the wear until a new lining can be substituted.

It will be understood, of course, that the precise details of construction above set out may be varied without departing from the spirit of the invention and that features of the invention may be employed without its adoption as an entirety.

I am well aware that it has been heretofore proposed to construct a journal-bearing with an iron or steel back having a gun-metal lining riveted thereto, a thin sheet of lead being interposed between said back and said lining, and said back being longitudinally grooved to receive a corresponding lug projecting from said lining. I am also aware that a composite journal-bearing has heretofore been proposed consisting of an outer, a middle, and an inner or brass section, the brass section being provided with a lead facing. Neither of such constructions, however, embodies the features of advantages characteristic of my present invention.

Having thus described my invention, what I claim as new, and desire to secure by Letters Patent, is—

1. A journal-bearing provided with a curved bearing-face of brass or like antifriction metal having solid ends, said face and ends being adapted in emergency to afford a bearing for the journal, its flange and shoulder, said face being longitudinally grooved intermediate its ends, and a thick, freely-detachable lining of relatively soft metal extending from end to end of said bearing and guarding the face thereof against normal contact with the journal, said lining being homogeneous throughout and being provided upon its back with a longitudinal lug terminating intermediate its ends, said lug being adapted to freely enter and pass from the grooved bearing and serving as the means for detachably connecting said lining to the bearing whereby the easy removal of said lining may be effected.

2. A journal-bearing provided with a curved bearing-face of brass or like antifriction metal having solid ends adapted in emergency to engage the wearing-surface, the flange and shoulder of the journal, and having seats running lengthwise of but terminating within the ends of said face, said seats lying upon opposite sides of the longitudinal center of the bearing, and a freely-removable, thick lining of relatively soft metal extending from end to end of said bearing and completely protecting its face from normal contact with the journal, said lining having a lug upon each side of its longitudinal center to enter the corresponding seat of the bearing and serving as the means for locking the lining to the bearing, the walls of the seats and lugs being shaped to permit the lining to be readily inserted and removed in a direction transverse to the axis of the bearing.

3. A journal-bearing comprising a back of malleable iron or like inferior metal, an emergency wearing-body of brass or like antifriction metal having solid ends and rigidly secured to said back and covering the inner face thereof from end to end, said emergency wearing-body being grooved longitudinally intermediate its ends and having its wearing-face and ends adapted in emergency to engage the wearing-surface, the flange and shoulder of the journal, and a thick lining of relatively soft metal extending from end to end of said wearing-body and being provided upon its back with a lug adapted to enter the groove of the wearing-body and serving as the means for detachably locking said lining to the wearing-body, whereby said lining may be freely removed in a direction transverse to the axis of the bearing.

4. A journal-bearing comprising a back of malleable iron or like inferior metal, an emergency wearing-body of brass or like antifriction metal rigidly secured to said back and covering the inner face thereof from end to end, the wearing-surface of said emergency-body being adapted in emergency to afford a bearing for the journal, its collar and flange and the concave surface of said wearing-body being provided at each side of its longitudinal center with a seat terminating within the ends of said wearing-face and a thick lining of relatively soft metal having lugs upon its back to enter the seat of said wearing-body, said lugs and said seats having their walls so relatively shaped as to permit the lining to be readily inserted and removed in a direction transverse to the axis of the bearing.

HERBERT H. HEWITT.

Witnesses:
GEO. P. FISHER, Jr.,
ALBERTA ADAMICK.